(12) United States Patent
Ishigaki et al.

(10) Patent No.: US 8,325,299 B2
(45) Date of Patent: Dec. 4, 2012

(54) LIQUID CRYSTAL DISPLAY DEVICE AND MANUFACTURING METHOD FOR SAME

(75) Inventors: Toshimasa Ishigaki, Chiba (JP); Yasukazu Kimura, Chiba (JP); Jun Fujiyoshi, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 424 days.

(21) Appl. No.: 12/759,120

(22) Filed: Apr. 13, 2010

(65) Prior Publication Data

US 2010/0259709 A1 Oct. 14, 2010

(30) Foreign Application Priority Data

Apr. 14, 2009 (JP) ................................. 2009-098012

(51) Int. Cl.
G02F 1/1335 (2006.01)
G02F 1/13 (2006.01)
(52) U.S. Cl. ........................... 349/106; 349/187; 438/30
(58) Field of Classification Search .................. 349/106, 349/187, 107, 108, 109, 110; 438/30
See application file for complete search history.

(56) References Cited

U.S. PATENT DOCUMENTS

| 6,897,918 | B1 * | 5/2005 | Nonaka et al. | 349/106 |
| 7,139,061 | B2 * | 11/2006 | Ikeda et al. | 349/156 |
| 8,023,072 | B2 * | 9/2011 | Tsubata et al. | 349/106 |
| 2006/0017865 | A1 * | 1/2006 | Tsubata et al. | 349/106 |
| 2009/0185116 | A1 * | 7/2009 | Song et al. | 349/107 |
| 2010/0259709 | A1 * | 10/2010 | Ishigaki et al. | 349/106 |

FOREIGN PATENT DOCUMENTS

JP 2007-121484 5/2007

* cited by examiner

*Primary Examiner* — Brian Healy
(74) *Attorney, Agent, or Firm* — Antonelli, Terry, Stout & Kraus, LLP.

(57) ABSTRACT

The present invention provides a manufacturing method for a liquid crystal display device, wherein the liquid crystal display device comprises first and second color filters provided on the liquid crystal side of one of a pair of substrates which are positioned so as to face each other and sandwich liquid crystal in between so as to be adjacent to each other, and a first side portion of the first color filter on the second color filter side overlaps with a second side portion of the second color filter on the first color filter side, characterized in that the border between the light blocking region and the non-light blocking region in a photomask for forming the first color filter, which corresponds to the first side portion, has a zigzag pattern with repeating mountains and valleys along this border, and the border between the light blocking region and the non-light blocking region in a photomask for forming the second color filter, which corresponds to the second side portion, has a zigzag pattern with repeating mountains and valleys along this border.

11 Claims, 13 Drawing Sheets

LIQUID CRYSTAL DISPLAY DEVICE AND MANUFACTURING METHOD FOR SAME

CROSS-REFERENCE TO RELATED APPLICATION

The present application claims priority over Japanese Application JP2009-098012 filed on Apr. 14, 2009, the contents of which are hereby incorporated into this application by reference.

BACKGROUND OF THE INVENTION (1) Field of the Invention

The present invention relates to a liquid crystal display device and a manufacturing method for the same, and in particular, to a liquid crystal display device having a color filter and a manufacturing method for the same.

(2) Description of the Related Art

In liquid crystal display devices for color display, a color filter is formed on the liquid crystal side of one of a pair of substrates that are positioned so as to face each other and sandwich liquid crystal in between. This color filter has different colors in a number of pixels (three, for example), which are units for color display.

In addition, the substrate on which the color filter is formed is a substrate where a thin film transistor which is a switching element for selecting a pixel is formed for each pixel, and the color filter is known to work also as a protective film and is formed so as to cover the above described thin film transistors in order to prevent the above described thin film transistors from making contact with the liquid crystal.

In this case, adjacent portions of the color filter having different colors are provided in such a manner that the side portion of a first color filter portion on a second color filter portion side overlaps with the side portion of the second color filter portion on the first color filter side.

In addition, one document relating to the present invention: JP2007-121484A, for example, discloses a technology according to which a color filter (negative photosensitive resin) is formed so as to cover a resin layer, also referred to as pillow or white layer, and exposure to light and development are carried out in the region of the above described resin layer using a light exposure mask where a so-called halftone layer is formed, and the film thickness is uniform throughout the entirety by reducing the film thickness of the color filter formed on the above described resin layer.

SUMMARY OF THE INVENTION

Liquid crystal display devices having a color filter on a substrate on which thin film transistors are formed are required to prevent large protrusions in portions where color filter portions overlap, so that the surface of color filter portions of different colors is uniform and flat.

In the case where there are protrusions on the surface of the color filter portions, as described above, the orientation film formed in a layer above these color filter portions is not rubbed uniformly, and there is also a disadvantage, such that the thickness of the liquid crystal layer is not uniform.

Thus, it is possible to control the film thickness in portions where color filter portions overlap using the technology in JP2007-121484A. However, the color filter in JP2007-121484A is a negative photosensitive resin, and it is difficult to reduce the film thickness for flattening using such a negative photosensitive resin for a halftone layer with a simple pattern for the light exposing mask in JP2007-121484A.

Negative photosensitive resins have such properties that the inclination of the film thickness is very steep in terms of the amount of light for exposure, and thus, there is a problem with negative photosensitive resins, such that it is extremely difficult to make half of the film thickness remain; that is to say, to control the film thickness to half.

An object of the present invention is to provide a liquid crystal display device where portions where color filter portions overlap can be flattened and a manufacturing method for the same.

Another object of the present invention is to provide a liquid crystal display device where portions where color filter portions overlap can be flattened even when the masks are imperfectly positioned when adjacent color filter portions are formed and a manufacturing method for the same.

In accordance with the manufacturing method for a liquid crystal display device according to the present invention, a first color filter and a second color filter are positioned so as to be adjacent to each other, so that a first side portion of the above described first color filter on the second color filter side overlaps with the second side portion of the above described second color filter on the first color filter side, and the pattern in the border between the light blocking region and the non-light blocking region which corresponds to the above described first side portion of the photomask for forming the first color filter and the pattern in the border between the light blocking region and the non-light blocking region which corresponds to the above described second side portion of the photomask for forming the second color filter are unique.

The present invention can provide the following structures, for example.

(1) The manufacturing method for a liquid crystal display device according to the present invention is a manufacturing method for a liquid crystal display device wherein the liquid crystal display device has a first color filter and a second color filter that are provided on the liquid crystal side of one of a pair of substrates which are positioned so as to face each other and sandwich liquid crystal in between so as to be adjacent to each other, and a first side portion of the above described first color filter on the second color filter side overlaps with a second side portion of the above described second color filter on the first color filter side, characterized in that the border between the light blocking region and the non-light blocking region in a photomask for forming the above described first color filter, which corresponds to the above described first side portion, has a zigzag pattern with repeating mountains and valleys along this border, and the border between the light blocking region and the non-light blocking region in a photomask for forming the above described second color filter, which corresponds to the above described second side portion, has a zigzag pattern with repeating mountains and valleys along this border.

(2) The manufacturing method for a liquid crystal display device according to (2) is the manufacturing method for a liquid crystal display device according to (1), characterized in that the first color filter and the second color filter are formed of a negative photosensitive resin.

(3) The manufacturing method for a liquid crystal display device according to the present invention is a manufacturing method for a liquid crystal display device, wherein the liquid crystal display device has a first color filter and a second color filter that are provided on the liquid crystal side of one of a pair of substrates which are positioned so as to face each other and sandwich liquid crystal in between so as to be adjacent to each other, and a first side portion of the above described first color filter on the second color filter side overlaps with a second side portion of the above described second color filter on the first color filter side, characterized in that in the border between the light blocking region and the non-light blocking region in a photomask for forming the above described first color filter, which corresponds to the above described first side portion, a number of protrusions of different heights which protrude from the above described light blocking region toward the above described non-light blocking region are created in such a manner as to form three or more steps which repeat along the above described border, and in the border between the light blocking region and the non-light blocking region in a photomask for forming the above described second color filter, which corresponds to the above described second side portion, a number of protrusions of different heights which protrude from the above described light blocking region toward the above described non-light blocking region are created in such a manner as to form three or more steps which repeat along the above described border.

(4) The manufacturing method for a liquid crystal display device according to (4) is the manufacturing method for a liquid crystal display device according to (3), characterized in that the first color filter and the second color filter are formed of a negative photosensitive resin.

(5) The liquid crystal display device according to the present invention is a liquid crystal display device having:

a first substrate and a second substrate which are positioned so as to face each other and sandwich liquid crystal in between; and at least a number of thin film transistors and a number of color filters of different colors which cover these thin film transistors on the liquid crystal side of the above described first substrate, wherein a first color filter and a second color filter are provided so as to be adjacent to each other, and a side portion of the above described first color filter on the second color filter side has a first inclined surface that is inclined at 45° or less relative to the surface of the first substrate and a second inclined surface is provided so as to face the above described first inclined surface in a side portion of the above described second color filter on the first color filter side, and the above described first color filter and the above described second color filter are provided in such a manner that the second inclined surface of the above described second color filter overlaps with the above described first inclined surface of the above described first color filter, characterized in that the border between the above described first color filter and the above described second color filter has a wave pattern along the above described border as viewed in a plane.

(6) The liquid crystal display device according to (6) is the liquid crystal display device according to (5), characterized in that the above described color filters are formed so as to also work as a protective film which prevents thin film transistors from making contact with the liquid crystal.

(7) The liquid crystal display device according to (7) is the liquid crystal display device according to (5), characterized in that the above described color filter is formed of a negative photosensitive resin film.

(8) The liquid crystal display device according to the present invention is a liquid crystal display device having:

a first substrate and a second substrate which are positioned so as to face each other and sandwich liquid crystal in between; and a number of thin film transistors on the liquid crystal side of the above described first substrate, and a number of color filters having different colors on the liquid crystal side of the above described second substrate, wherein a first color filter and a second color filter are provided so as to be adjacent to each other, and a side portion of the above described first color filter on the second color filter side has a first surface that is inclined at 45° or less relative to the surface of the first substrate and a second inclined surface is provided so as to face the above described first inclined surface in a side portion of the above described second color filter on the first color filter side, and the above described first color filter and the above described second color filter are provided in such a manner that the second inclined surface of the above described second color filter overlaps with the above described first inclined surface of the above described first color filter, characterized in that the border between the above described first color filter and the above described second color filter has a wave pattern along the above described border as viewed in a plane.

(9) The liquid crystal display device according to (9) is the liquid crystal display device according to (8), characterized in that the above described color filter is formed of a negative photosensitive resin film.

Here, the above described structures are merely examples, and various modifications are possible, as long as the technological idea of the present invention is not deviated from. In addition, examples of the structure of the present invention other than those described above will become clearer from the descriptions throughout the present specification and the drawings.

In the liquid crystal display device and the manufacturing method for the same according to the invention, overlapping portions between color filters can be flattened.

Other effects of the present invention will become clearer from the descriptions throughout the specification.

DESCRIPTION OF THE PREFERRED EMBODIMENTS

Figure 1:
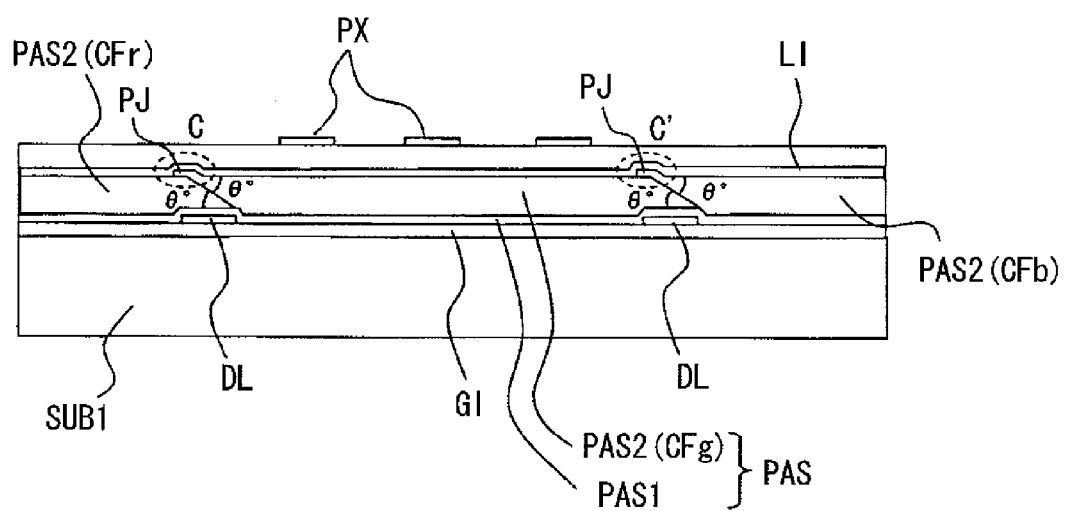
FIG. 1 is a cross sectional diagram showing the main portion of the liquid crystal display device according to one embodiment of the present invention.

The embodiments of the present invention are described in reference to the drawings. Here, the same symbols are used for components that are the same or similar in the drawings and embodiments, and descriptions that are the same are not repeated.

First Embodiment

Figure 2:
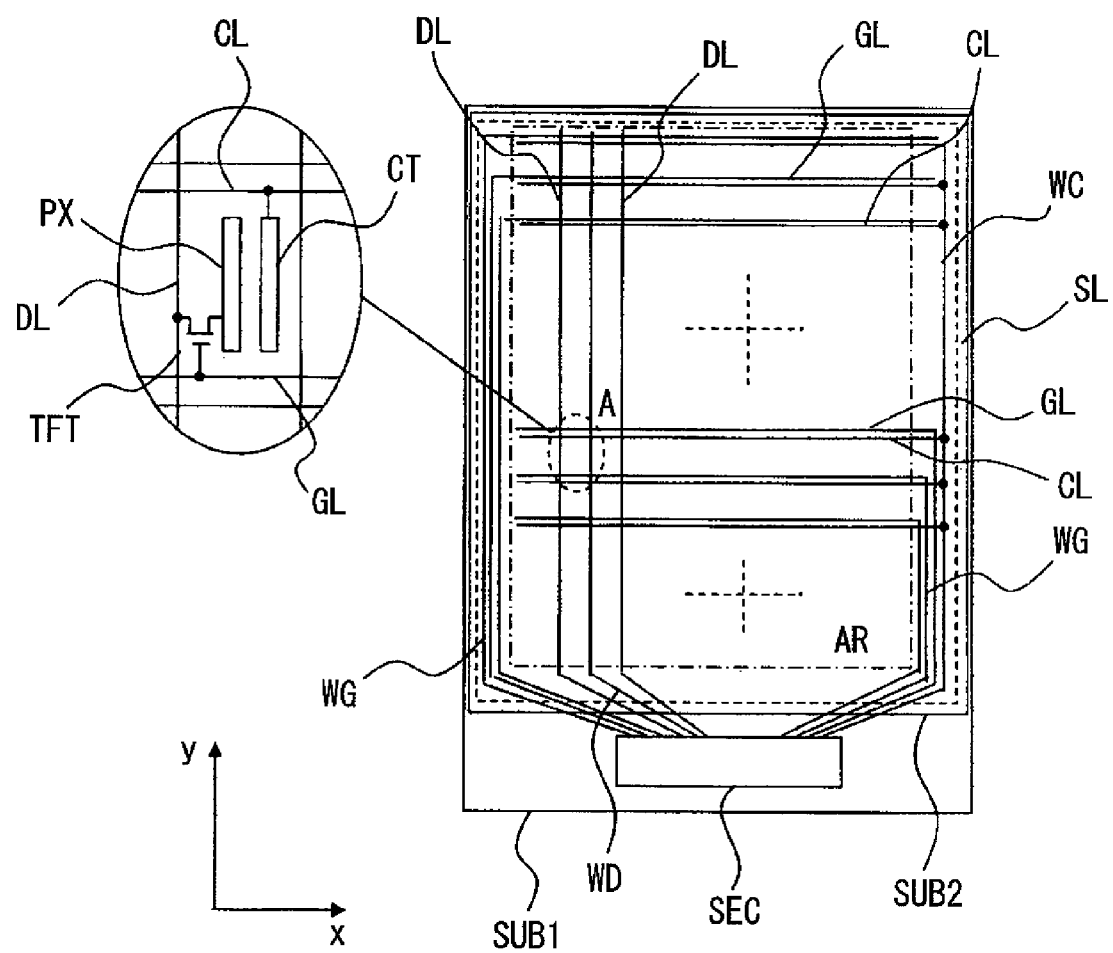
FIG. 2 is a diagram showing the entire configuration of the liquid crystal display device according to one embodiment of the present invention.

FIG. 2 is a schematic plan diagram showing the liquid crystal display device according to the first embodiment of the present invention. FIG. 2 shows an example of a liquid crystal display device for a cellular phone, for example.

In FIG. 2, a substrate SUB1 and a substrate SUB2 are provided so as to face each other and sandwich liquid crystal (not shown) in between. The substrate SUB2 is formed so as to have a slightly smaller area than the substrate SUB1, and positioned so as to expose the lower side portion of the substrate SUB1 as in the figure. A semiconductor device (chip) SEC for driving the pixels in the liquid crystal display device is mounted face down in the side portion on the bottom side of the substrate SUB1 as in the figure.

An annular sealing material SL is formed around the periphery of the substrate SUB2 between the substrate SUB1 and the substrate SUB2 so that the substrate SUB1 and the substrate SUB2 are pasted together and the above described liquid crystal is sealed in.

Gate signal lines GL which run in the direction y and are aligned in the direction y in the figure and drain signal lines DL which run in the direction y and the are aligned in the direction x in the figure are formed in the region surrounded by the sealing material SL on the liquid crystal side of the substrate SUB1. In addition, common signal lines CL are formed between adjacent gate signal lines GL so as to run parallel to the gate signal lines GL.

Rectangular regions surrounded by adjacent gate signal lines GL and adjacent drain signal lines DL are regions where pixels are formed (as in the dotted circle A in the figure), and these pixels are arranged in a matrix, and thus, an image display portion AR is formed (region surrounded by single-dot chain line in the figure). The structure of the pixels is described below.

One of the two ends; left or right in the figure, of each of the above described gate signal lines GL is connected to an output electrode of the semiconductor device SEC via a lead line WG formed in a region between the image display portion AR and the sealing material SL. A scan signal is supplied to each of the gate signal lines GL from the semiconductor device SEC.

The bottom end of each of the above described drain signal lines DL in the figure is connected to an output electrode of the semiconductor device SEC via a lead line WD. A video signal is supplied to each of the drain signal lines DL from the semiconductor device SEC.

The right end of all of the above described common signal lines CL in the figure is connected to the lead line WC formed in a region between the image display portion AR and the sealing material SL, and further connected to an output electrode of the semiconductor device SEC via this lead line WC. A signal (reference signal) which becomes a reference for the above described video signal is supplied to each of the common signal lines CL from the semiconductor device SEC.

The equivalent circuit of the above described pixels is shown in the enlargement A' showing the area inside the dotted circle A in FIG. 2. As shown in the enlargement A', pixels are provided with a thin film transistor TFT which is turned on when a scan signal is supplied from a gate signal line GL, a pixel electrode PX to which a video signal is supplied from a drain signal line DL through the thin film transistor TFT when turned on, and a counter electrode CT for generating an electrical field between the pixel electrode PX and the counter electrode CT. In pixels having this structure, an electrical field having a component parallel to the substrate (for example the substrate SUB1) is generated between the pixel electrode PX and the counter electrode CT, and the electrical field controls the liquid crystal molecules. Liquid crystal display devices having such pixels are referred to as lateral electrical field type or IPS type. However, the type of liquid crystal display device is not limited, and this invention can be applied to liquid crystal display devices of a so-called vertical electrical field type, for example TN (twisted nematic) devices.

(Structure of Pixels)

Figure 3A:
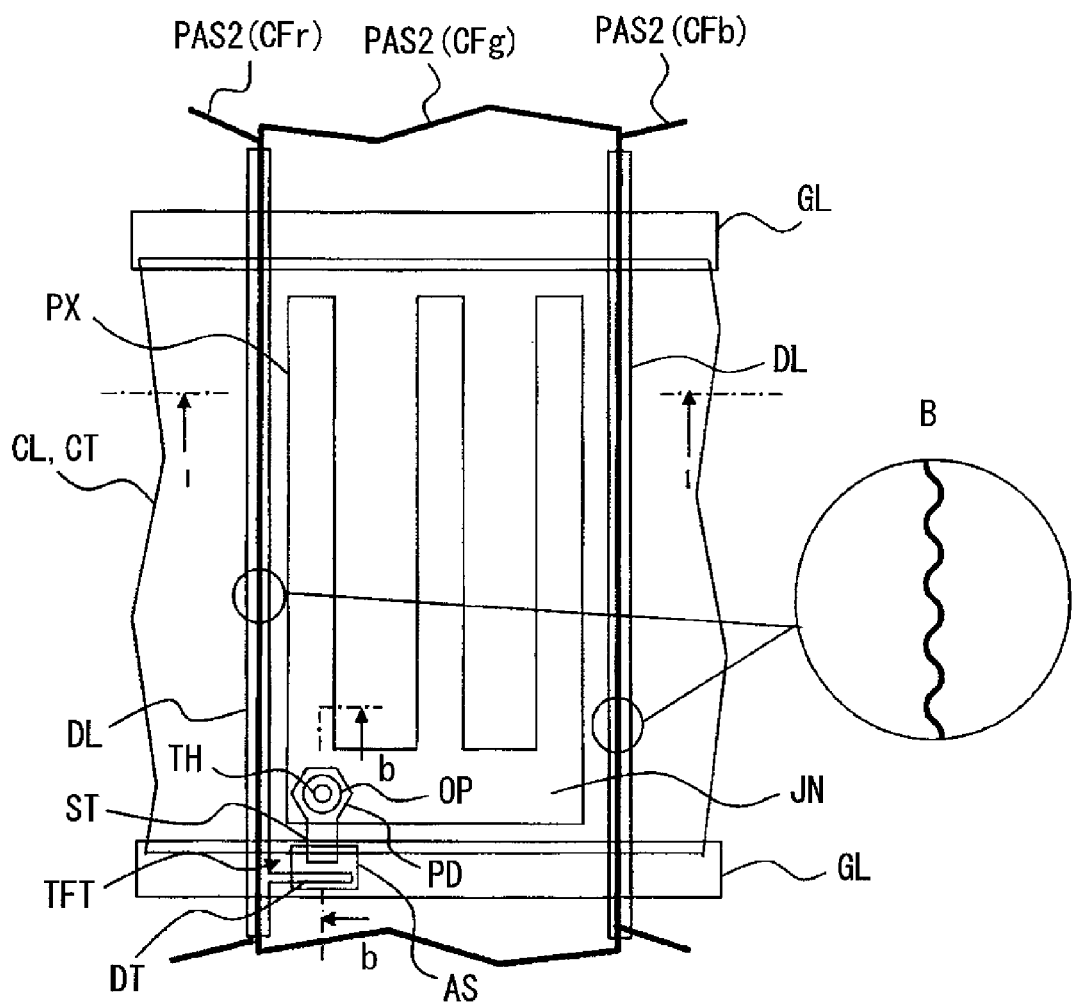
FIGS. 3A and 3B are diagrams showing the structure of a pixel in the liquid crystal display device according to one embodiment of the present invention.
Figure 3B:
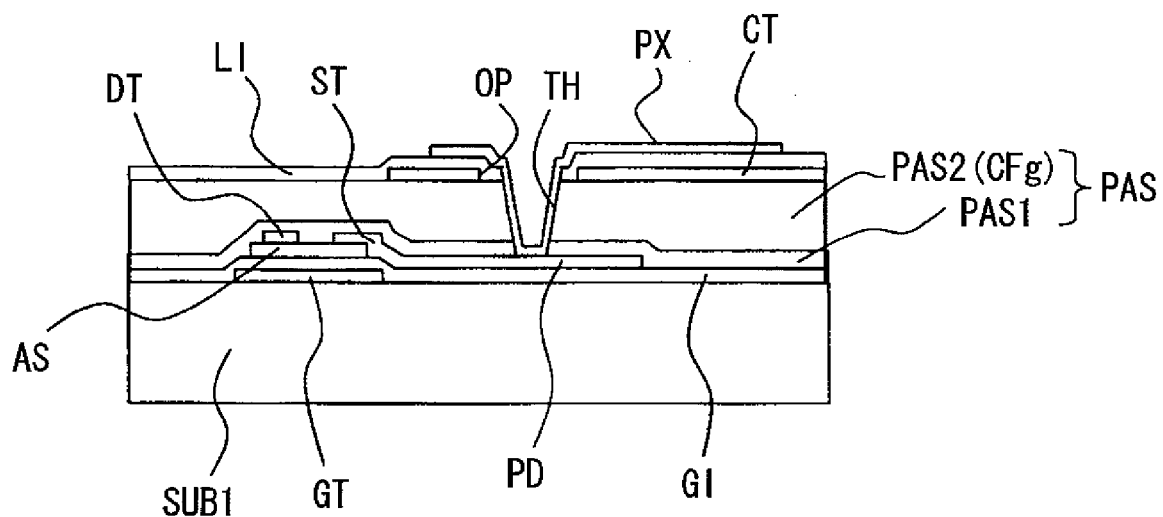

FIGS. 1, 3A and 3B are diagrams showing the structure of pixels formed on the liquid crystal side of the substrate SUB1 and the structure in the portion in the dotted circle A in FIG. 2. FIG. 3A is a plan diagram, FIG. 3B is a cross sectional diagram along line b-b in FIG. 3A, and FIG. 1 is a cross sectional diagram along line I-I in FIG. 3A.

Gate signal lines GL which run in the direction x and are aligned in the direction y in the figure are formed on the liquid crystal side of the substrate SUB1. An insulating film GI (see FIG. 3B) is formed on the surface of the substrate SUB1 so as to cover the gate signal lines GL, and this insulating film GI works as a gate insulating film in the region where the below described thin film transistors TFT are formed.

A semiconductor layer AS is formed of amorphous Si in island form in the region where thin film transistors TFT are formed so as to partially overlap the gate signal lines GL on the surface of the insulating film GI, for example. The above described thin film transistors TFT are MIS (metal insulator semiconductor) transistors having a reverse stagger structure where a drain electrode DT and a source electrode ST are formed so as to face each other on the surface of the above described semiconductor layer AS so that part of a gate signal line GL is used as the gate electrode.

Drain signal lines DL which run in the direction y and are aligned in the direction x in the figure are formed on the surface of the above described substrate SUB1, and these drain signal lines DL partially extend on the surface of the above described semiconductor layer AS so that the extended portions are used as the drain electrodes DT of the thin film transistors TFT. In addition, when drain signal lines DL are formed, source electrodes ST of the thin film transistors TFT are formed so that these source electrodes ST are formed to have a pad portion PD which extends to the pixel region beyond the region where the semiconductor layer AS is formed.

A passivation film PAS is formed on the surface of the above described substrate SUB1 so as to cover the drain signal lines DL. This passivation film PAS prevents the thin film transistors TFT from making direct contact with the liquid crystal so that the properties of the above described thin film transistors TFT can be prevented from deteriorating. This passivation film PAS has a two-layer structure and is formed of a passivation film PAS1 made of a silicon oxide film (film thickness: 300 nm), for example, and a passivation film PAS2 made of a resin film (film thickness: 2 μm), for example.

Here, the passivation film PAS2 has such a structure as to also work as a color filter CF. A green (G) color filter (indicated by the symbol PAS2 (CFg)) is formed in the pixel region at the center of FIG. 3A, and this color filter PAS2 (CFg) runs in the direction y in the figure so as to be shared by the color filters in other pixel regions which are aligned in the direction y in the figure, for example. A red (R) color filter (indicated by the symbol PAS2 (CFr)) is formed in the pixel region on the left of FIG. 3A, and this color filter PAS2 (CFr) runs in the direction y in the figure so as to be shared by the color filters in other pixel regions which are aligned in the direction y in the figure, for example. A blue (B) color filter (indicated by the symbol PAS2 (CFb)) is formed in the pixel region on the right of FIG. 3A, and this color filter PAS2 (CFb) runs in the direction y in the figure so as to be shared by the color filters in other pixel regions which are aligned in the direction y in the figure, for example. In this case, three adjacent pixels aligned in the direction x in the figure form a unit pixel for color display, for example. Color filters PAS2 (CFr), color filters PAS2 (CFg) and color filters PAS2 (CFb) are formed by mixing a pixel of red (R), green (G) or blue (B) into the resin film that forms the respective passivation films PAS2.

Figure 4:
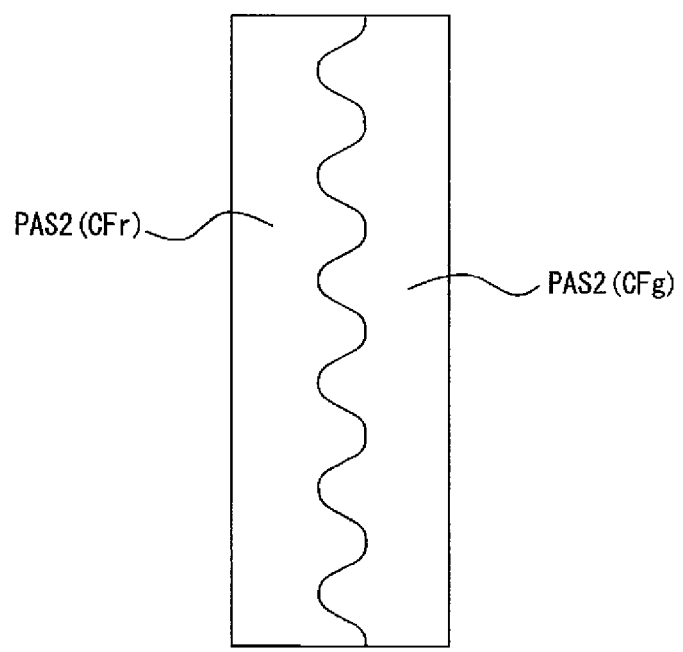
FIG. 4 is a plan diagram showing the border between adjacent color filters in the liquid crystal display device according to the present invention.

Color filters PAS2 (CFr), color filters PAS2 (CFg) and color filters PAS2 (CFb) are formed in this order, for example. As shown in FIG. 1, the side portion of the color filter PAS2 (CFr) on the color filter PAS2 (CFg) side has a gradually inclining surface forming an angle θ° (45° or less) relative to the surface of the substrate SUB1 and also has an inclining surface facing the above described inclining surface along the side portion of the color filter PAS2 (CFg) on the color filter PAS2 (CFr) side, and thus, the color filter PAS2 (CFr) and the color filter PAS2 (CFg) are positioned in such a manner that the above described inclining surface of the color filter PAS2 (CFg) overlaps the above described inclining surface of the color filter PAS2 (CFr) Likewise, the side portion of the color filter PAS2 (CFg) on the color filter PAS2 (CFb) side has a gradually inclining surface forming an angle θ° (45° or less) relative to the surface of the substrate SUB1 and also has an inclining surface facing the above described inclining surface along the side portion of the color filter PAS2 (CFb) on the color filter PAS2 (CFg) side, and thus, the color filter PAS2 (CFg) and the color filter PAS2 (CFb) are positioned in such a manner that the above described inclining surface of the color filter PAS2 (CFb) overlaps the above described inclining surface of the color filter PAS2 (CFg). Furthermore, the border between the color filter PAS2 (CFr) and the color filter PAS2 (CFg) and the border between the color filter PAS2 (CFg) and the color filter PAS2 (CFb) (also the border between the color filter PAS2 (CFb) and the color filter PAS2 (CFr), not shown) have a wave pattern along the border as shown in the enlargement B in the solid circles in FIG. 3A. FIG. 4 is a diagram showing the border between a color filter PAS2 (CFr) and a color filter PAS2 (CFg), for example, and the edge of the color filter PAS2 (CFg) that overlaps the color filter PAS2 (CFr) has a regular wave pattern in the longitudinal direction.

The color filters PAS2 (CFr), color filters PAS2 (CFg) and color filters PAS2 (CFb) have the above described structure because these color filters PAS2 (CFr), PAS2 (CFg) and PAS2 (CFb) are manufactured through exposure to light using a below described photomask and through development. In addition, even in the case where, as shown in the dotted circles C and C' in FIG. 1, one color filter CF overlaps the other color filter CF with a protrusion formed therein on the border between the thus-formed color filters PAS2 (CFr) and PAS2 (CFg) and the border between the color filters PAS2 (CFg) and PAS2 (CFb) (also the border between the color filters PAS2 (CFb) and PAS2 (CFr), not shown), the height of the protrusion is sufficiently small and a color filter CF (passivation film PAS2) of which the surface is flat as a whole can be formed.

Returning to FIG. 3A, a common signal line CL is formed between adjacent gate signal lines CL on the surface of the passivation film PAS2, which also works as a color filter CF, so as to run in the direction in which the gate signal lines CL run. This common signal line CL is formed so as to cover almost the entirety of the pixel regions which are aligned in the direction x in the figure and has such a structure as to work as the counter electrode CT in each pixel region. This common signal line CL (counter electrode CT) is formed of a transparent conductive film made of ITO (indium tin oxide), for example.

An insulating film LI made of an inorganic insulating film (film thickness: 300 nm, for example) is formed on the surface of the substrate SUB1 so as to cover the common signal lines CL (counter electrodes CT), and a pixel electrode PX is formed on the upper surface of this insulating film LI in each pixel region. The insulating film LI works as an interlayer insulating film for isolating the pixel electrodes PX and the below described counter electrodes CT from each other. Pixel electrodes PX are made up of a number (three in the figure) of linear electrodes which run in the direction y and are aligned in the direction x in the figure, and these electrodes are provided with a connection portion JN for connecting these electrodes to each other in the end portions on the thin film transistor TFT side. The pixel electrodes PX are formed of a transparent conductive film made of ITO (indium tin oxide), for example. A portion of the connection portion JN in the pixel electrodes PX is electrically connected to the pad portion PD in the above described source electrode ST through the through hole TH created in the interlayer insulating film LI and the insulating film PAS. In this case, an opening OP, which is approximately coaxial with the above described through hole TH and has a diameter much greater than the through hole TH, is created in the common signal line CL (counter electrode CT) so that the above described pixel electrode PX can be prevented from being electrically connected to the counter electrode CT. Here, an alignment film, not shown in this figure nor in FIG. 1, is formed on the surface of the insulating film LI on which pixel electrodes PX are formed so as to cover the pixel electrodes PX.

As is clear from the above description, in the liquid crystal display device according to the present invention, the surface of the passivation film PAS2, which also acts as a color filter CF, can be flattened in the substrate SUB1 on which thin film transistors TFT are formed.

(Manufacturing Method)

Figure 5:
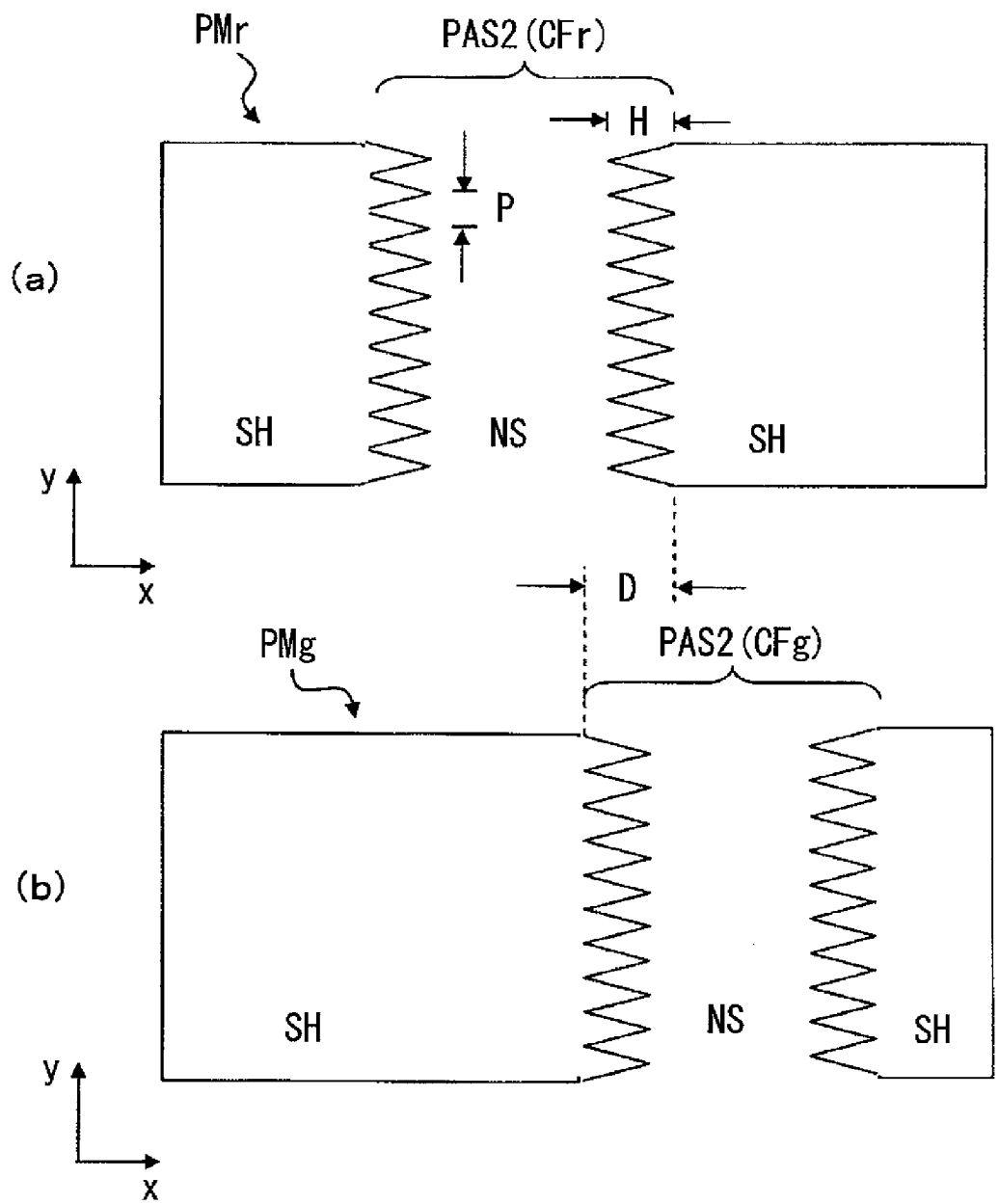
FIGS. 5A and 5B are diagrams showing an example of the photomask used in the manufacturing method for a liquid crystal display device according to the present invention.

FIGS. 5A and 5B are diagrams illustrating the manufacturing method for a liquid crystal display device according to an embodiment of the present invention. FIG. 5A shows light shielding regions SH and a light transmitting region NS in a photomask PMr for forming a color filter PAS2 (CFr) as shown in FIG. 1, and FIG. 5B shows light shielding regions SH and a light transmitting region NS in a photomask PMg for forming a color filter PAS2 (CFg). Here, the length of the light shielding regions SH and the light transmitting region NS in the direction y in FIGS. 5A and 5B is determined so as to correspond to the length of the color filter to be formed in the direction y in the figures, and it is short in FIGS. 5A and 5B.

In addition, the color filters PAS2 (CFr) and PAS2 (CFg) to be formed use a negative photosensitive resin, for example. Therefore, in FIG. 5A, a color filter PAS2 (CFr) is formed in the portion corresponding to the light transmitting region NS of the photomask PMr, and in FIG. 5B, a color filter PAS2 (CFg) is formed in the portion corresponding to the light transmitting region NSH of the photomask PMg. Here, the photomask PMr and the photomask PMg have such a positional relationship that their light transmitting regions NS overlap each other by D (approximately 5.0 µm).

In FIG. 5A, the border between the light shielding regions SH and the light transmitting region NS in the photomask PMr has a zigzag pattern with repeating mountains and valleys along the border. Here, in the zigzag pattern, the pitch P is approximately 3.0 µm and the height of the mountains (depth of the valleys) H is approximately 4.0 µm, for example.

Figure 6A:
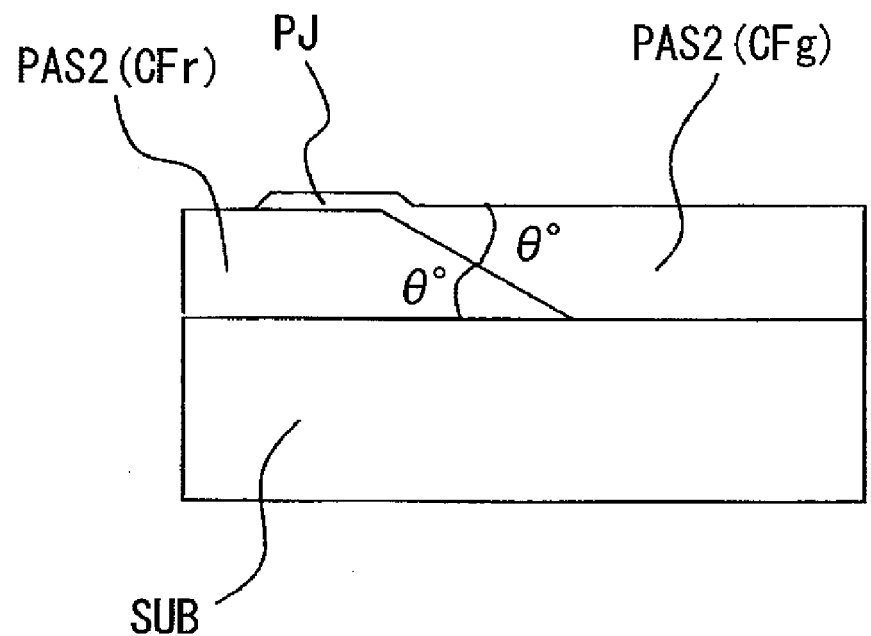
FIGS. 6A and 6B are cross sectional diagrams showing a color filter formed using the photomask in FIG. 5.

In the case where a color filter PAS2 (CFr) is formed using this photomask PMr, as shown in the cross sectional diagram of FIG. 6A, a gradually inclining surface forming an angle θ° which is 45° or less relative to the substrate SUB is formed along the edge of the color filter PAS2 (CFr) in the longitudinal direction. The zigzag pattern of the above described photomask PMr allows the amount of transmitting light to become gradually smaller towards the light shielding regions SH from the light transmitting region NS, and therefore, a gradually inclining surface can be formed along the edge of the above described color filter PAS2 (CFr).

Meanwhile, the border between the light shielding regions SH and the light transmitting region NS in the photomask PMg in FIG. 5B has a zigzag pattern with repeating mountains and valleys along the border. In addition, in the zigzag pattern, the pitch P is approximately 3.0 µm and the height of the mountains (depth of the valleys) H is approximately 4.0 µm, for example. In the case where a color filter PAS2 (CFg) is formed using this photomask PMg, as shown in the cross sectional diagram of FIG. 6A, the edge of the color filter PAS2 (CFg) on the color filter PAS2 (CFr) side is provided with an inclining surface (angle θ°) which is formed so as to face the above described inclining surface of the color filter PAS2 (CFr). This is because in the same manner as in the above, the zigzag pattern of the photomask allows the amount of transmitting light to become gradually smaller towards the light shielding regions SH from the light transmitting region NS. Therefore, even in the case where small protrusions PJ are formed in the portion where the color filter PAS2 (CFg) overlaps the color filter PAS2 (CFr), the height of the protrusions PJ is sufficiently small and the filters can be kept flat.

Figure 6B:
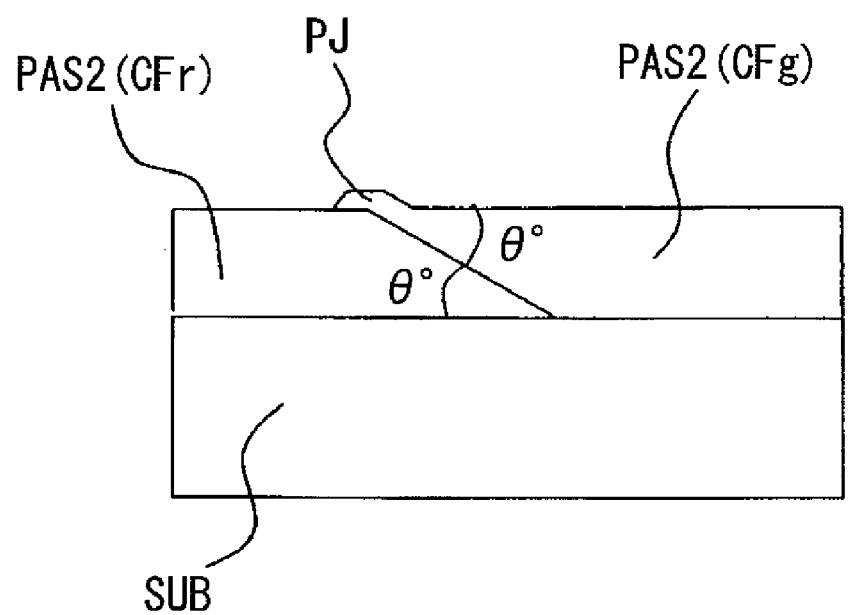

Here, FIG. 6A is a cross sectional diagram showing a case where a color filter PAS2 (CFr) and a color filter PAS2 (CFg) are formed when the photomask PMg in FIG. 5B is made closer to the photomask PMr in FIG. 5A by 1 µm, that is to say, the photomask PMg shifts to the left in the figure. In addition, FIG. 6B is a cross sectional diagram showing a case where a color filter PAS2 (CFr) and a color filter PAS2 (CFg) are formed when the photomask PMg in FIG. 5B is made closer to the photomask PMr in FIG. 5A by 1 µm, that is to say, the photomask PMg shifts to the right in the figure. As is clear from these FIGS. 6A and 6B, such effects are gained that the height of the protrusions PJ generated in the portion where the color filter PAS2 (CFg) overlaps the color filter PAS2 (CFr) seldom changes even when the photomasks PMr and PMg shift.

Also in the case where a color filter PAS2 (CFb) is formed, the flatness can be secured in the portion where the color filter PAS2 (CFb) overlaps the color filter PAS2 (CFg) by using the same method as in the above, though this is not shown.

Comparative Example 1

Figure 7:
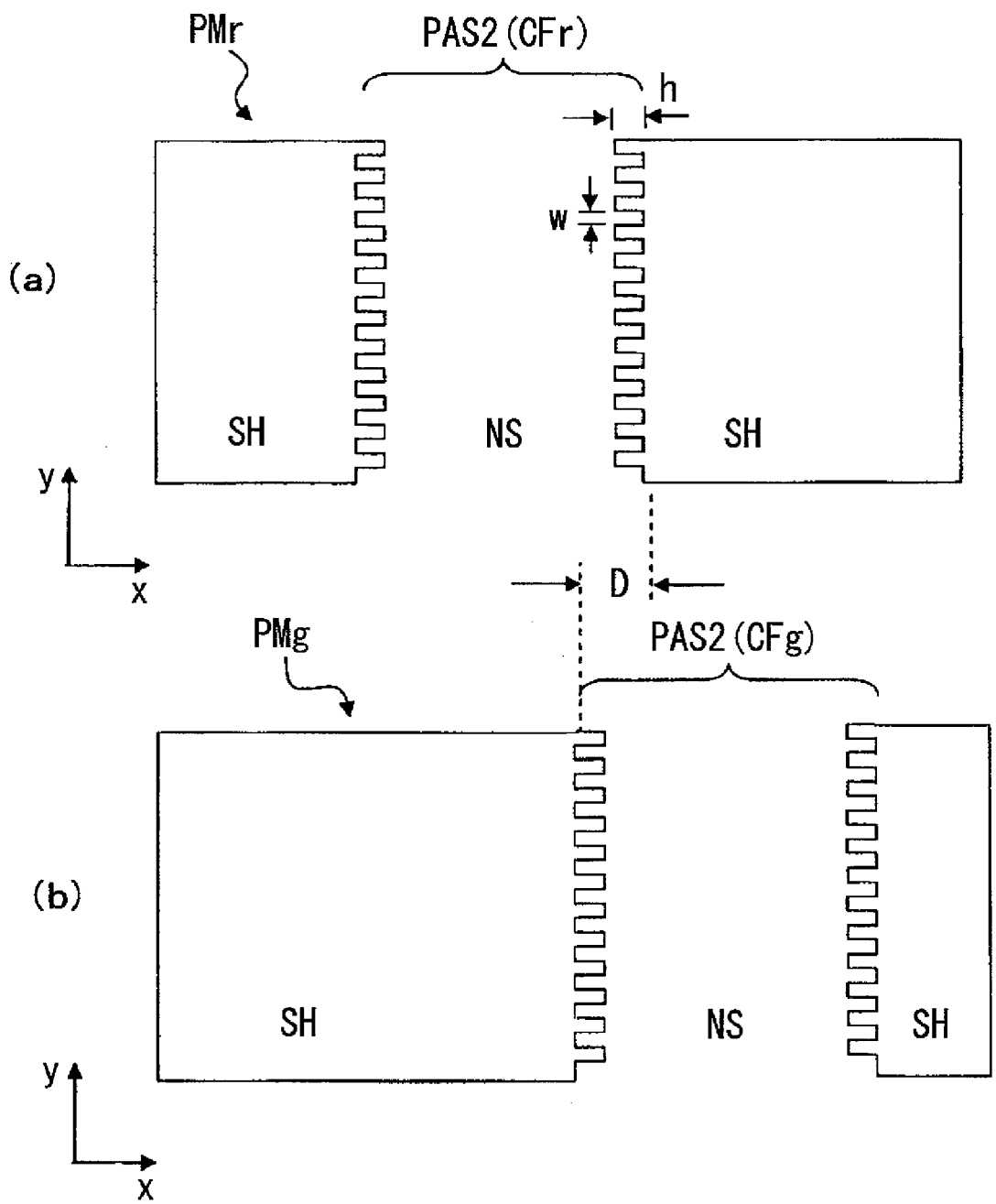
FIGS. 7A and 7B are diagrams showing the photomask of Comparative Example 1.

FIGS. 7A and 7B are diagrams showing Comparative Example 1 in order to clarify the effects of the first embodiment, and correspond to FIGS. 5A and 5B.

This is a case where a color filter PAS2 (CFr) is formed using the photomask PMr in FIG. 7A and a color filter PAS2 (CFg) is formed using the photomask PMg in FIG. 7B. The photomasks PMr and PMg are formed so that protrusions having a height h of approximately 3.0 µm and a width of approximately 1.5 µm are aligned along the border between the light blocking regions SH and the light transmitting region NS so as to protrude from the light blocking regions SH. The photomask PMr and the photomask PMg are positioned so as to overlap by D (approximately 4.0 µm) in the respective light transmitting regions NS.

Figure 8A:
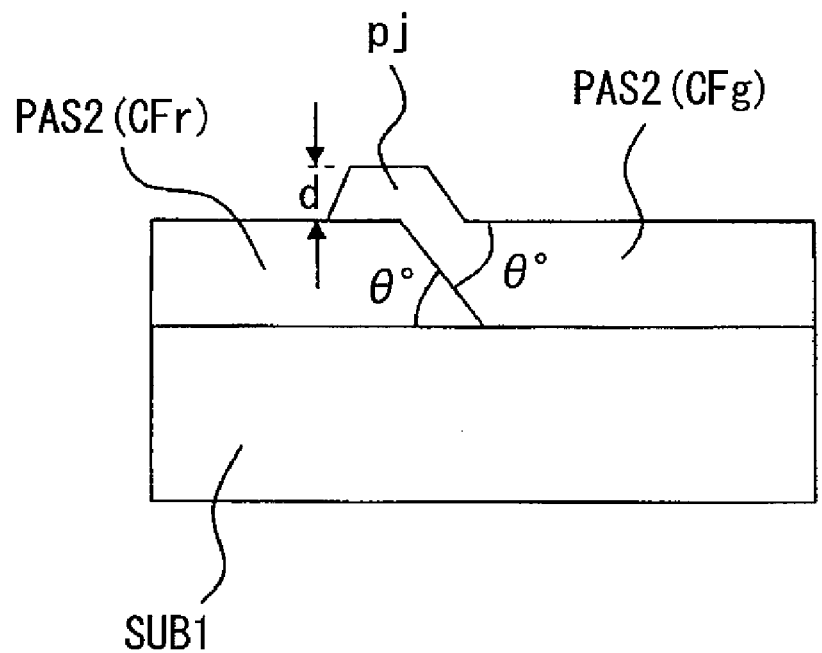
FIGS. 8A and 8B are cross sectional diagrams showing a color filter formed using the photomask in FIGS. 7A and 7B.
Figure 8B:
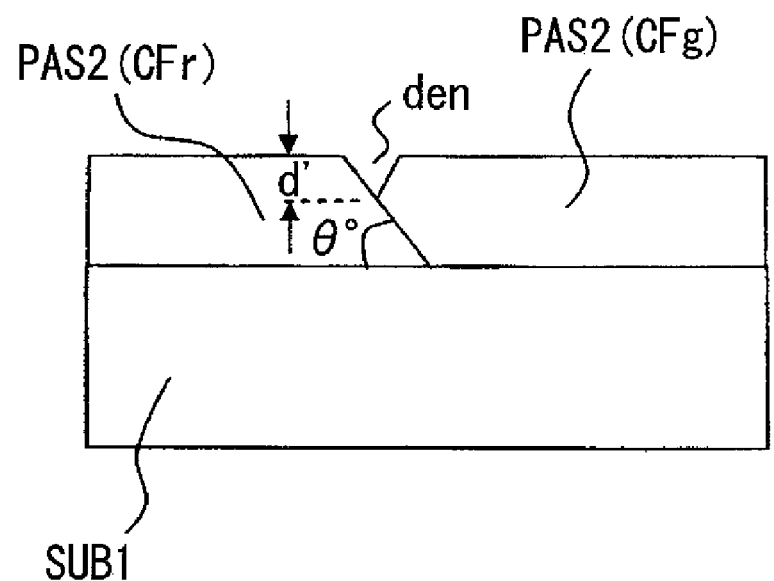

FIGS. 8A and 8B are cross sectional diagrams showing a color filter PAS2 (CFr) and a color filter PAS2 (CFg) which are formed using the above described photomasks PMr and PMg. FIG. 8A shows a case where the color filter is exposed to light with the photomask PMg closer to the photomask PMr; that is to say, to the left in the figure, by 1 µm, and FIG. 8B shows a case where the color filter is exposed to light with the photomask PMg closer to the photomask PMr; that is to say, to the right in the figure, by 1 µm.

Figure 9:
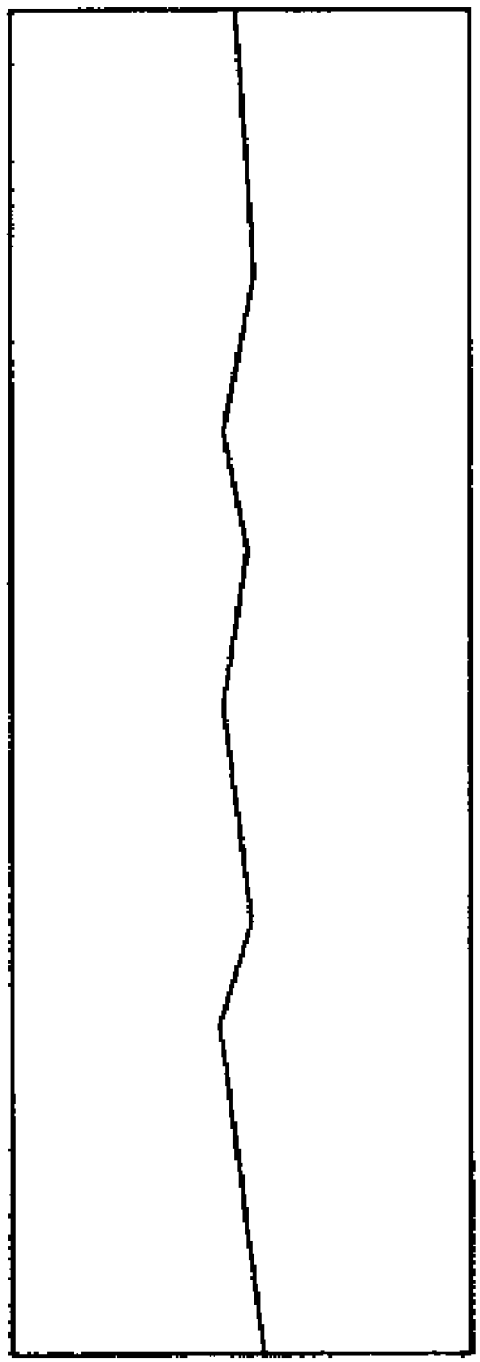
FIG. 9 is a plan diagram showing the border between adjacent color filters formed using the photomask in FIGS. 7A and 7B.

In both FIG. 8A and FIG. 8B, the color filter PAS (CFr) and the color filter PAS (CFg) have a film thickness of approximately 2.2 µm and the inclining surface formed on the color filter PAS2 (CFr) has an angle θ of approximately 60°. In addition, in the case of FIG. 8A, the portion where the color filter PAS2 (CFr) and the color filter PAS2 (CFg) overlap has a protrusion pj, and the step d caused by this protrusion is approximately 0.8 µm, while in the case of FIG. 8B, the portion where the color filter PAS2 (CFr) and the color filter PAS2 (CFg) overlap has a recess den, and the step d' caused by this recess den is approximately 0.5 µm. As is clear from this, the surface of the color filters is not sufficiently flat in the case of Comparative Example 1. In addition, the border between the color filter PAS2 (CFr) and the color filter PAS2 (CFg) is lightly zigzagged, as shown in FIG. 9, as viewed in a plane (dimensions correspond to FIG. 4), and this pattern cannot be said to be wavy.

Comparative Example 2

Figure 10:
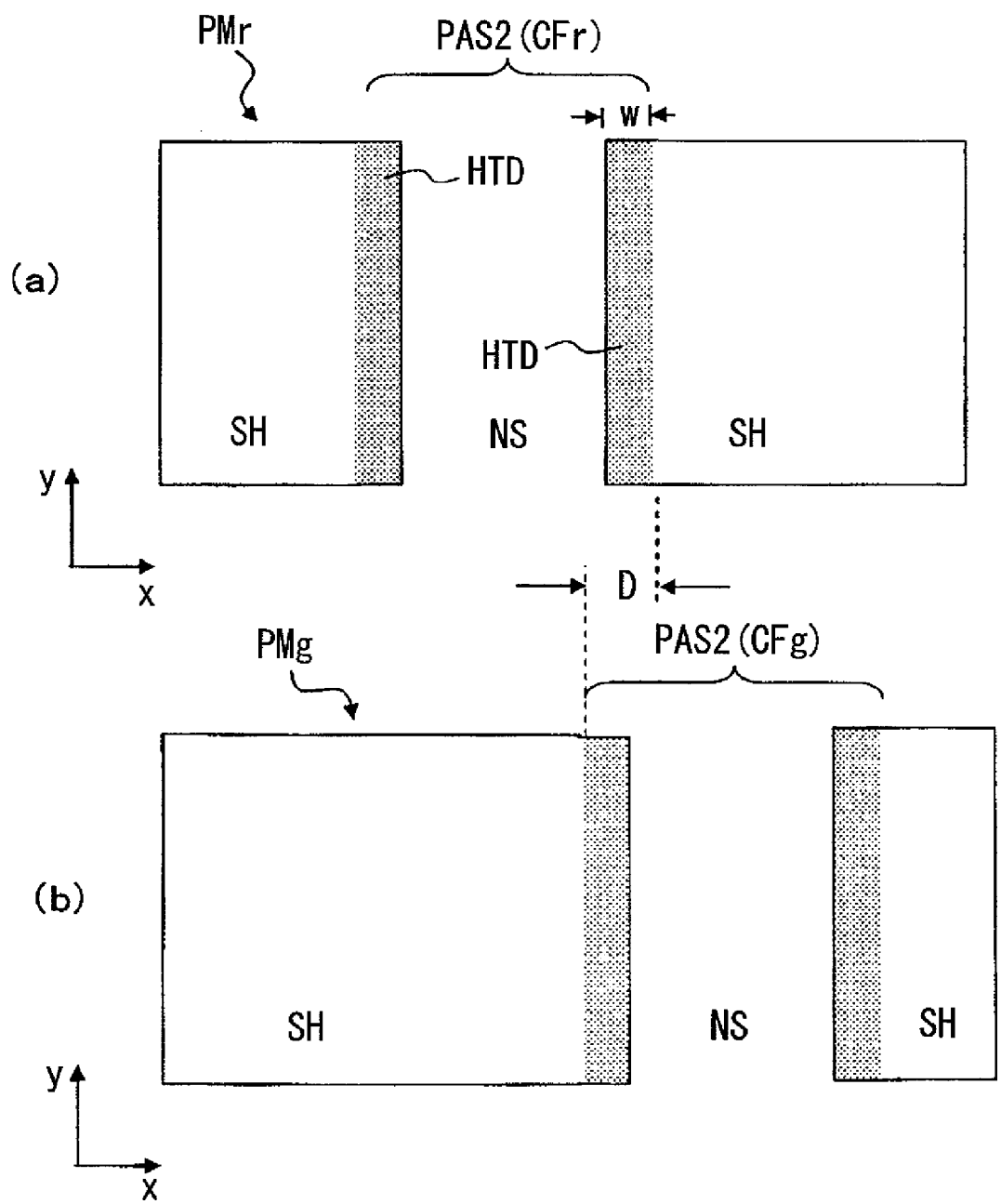
FIGS. 10A and 10B are diagrams showing the photomask of Comparative Example 2.

FIGS. 10A and 10B are diagrams showing Comparative Example 2 in order to clarify the effects of the first embodiment, and correspond to FIGS. 5A and 5B.

This is a case where a color filter PAS2 (CFr) is formed using the photomask PMr in FIG. 10A and a color filter PAS2 (CFg) is formed using the photomask MPg in FIG. 10B. The photomasks PMr and PMg are formed so that the border between the light blocking regions SH and the light transmitting region NS has a halftone region HTD with a width w of approximately 3.0 µm. The photomasks PMr and PMg are positioned so as to overlap by D (approximately 4.5 µm) in the respective light transmitting regions NS.

The cross sectional diagrams showing the color filter PAS2 (CFr) and the color filter PAS2 (CFg) formed using these photomasks PMr and PMg are approximately the same as FIGS. 8A and 8B.

In both FIGS. 8A and 8B, the color filter PAS2 (CFr) and the color filter PAS2 (CFg) have a film thickness of approximately 2.2 µm, and the inclining surface formed on the color filter PAS2 (CFr) has an angle θ° of approximately 60°. In addition, in the case of FIG. 8A, the portion where the color filter PAS2 (CFr) and the color filter PAS2 (CFg) overlap has a protrusion pj, and the step d caused by this protrusion pj is approximately 0.9 µm, while in the case of FIG. 8B, the portion where the color filter PAS2 (CFr) and the color filter PAS2 (CFg) overlap has a recess den, and the step d' caused by this recess den is approximately 0.4 µm. As is clear from this, in the case of Comparative Example 2 also, the surface of the color filters is not sufficiently flat. In addition, the border between the color filter PAS2 (CFr) and the color filter PAS2 (CFg) is lightly zigzagged in almost the same manner as in FIG. 9, and this pattern cannot be said to be wavy.

Second Embodiment

In the first embodiment, the structure of the color filter CF, which also works as a passivation film PAS2, is described as being on the substrate SUB1 side, where thin film transistors TFT are provided. However, the invention is not limited to this, and the present invention may be applied to the color filter CF formed on the substrate SUB2 side where the substrate SUB2 faces the substrate SUB1 having thin film transistors TFT with liquid crystal in between.

Figure 11:
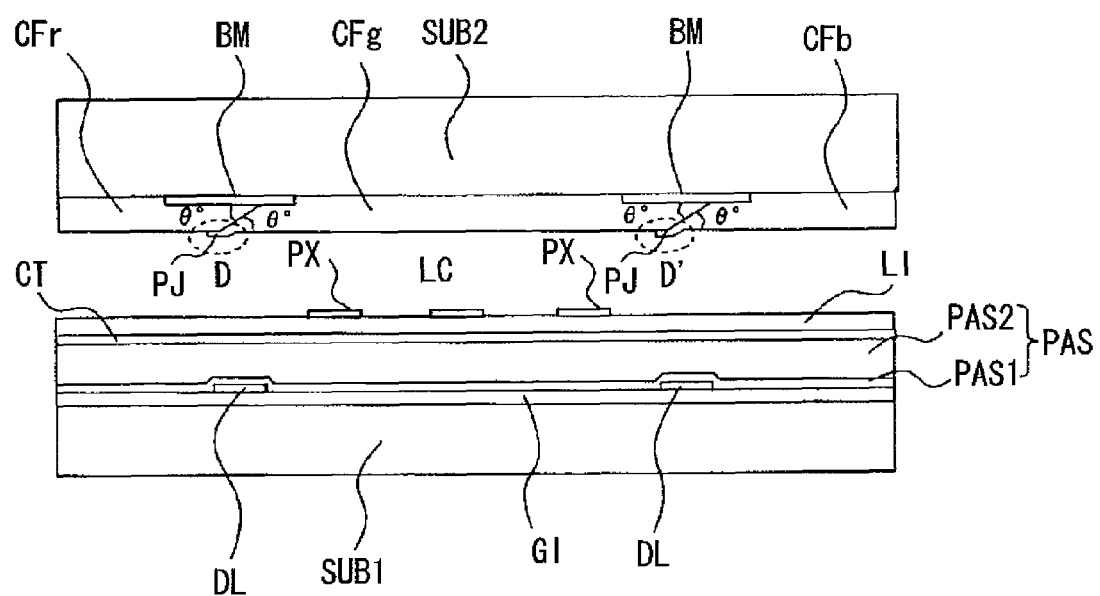
FIG. 11 is a cross sectional diagram showing the main portion of the liquid crystal display device according to another embodiment of the present invention.

FIG. 11 is a cross sectional diagram showing a liquid crystal display device formed by applying the present invention. In FIG. 11, a substrate SUB1 and a substrate SUB2 are provided so as to face each other with liquid crystal LC in between. As shown in FIG. 11, which corresponds to FIG. 1, in the structure of the substrate SUB1 on the liquid crystal side, the passivation film PAS2 works only as a passivation film, and not as a color filter. A black matrix (light blocking film) BM which determines the border between the pixel regions is formed on the surface of the substrate SUB2 on the liquid crystal side, and a color filter CF is formed on the upper surface thereof. A green (G) color filter (indicated by the symbol CFg in the figure) is formed in the pixel region at the center in FIG. 11, for example, a red (R) color filter (indicated by the symbol CFr in the figure) is formed in the pixel region on the left in FIG. 11, and a blue (B) color filter (indicated by the symbol CFb in the figure) is formed in the pixel region on the right in FIG. 11. The color filter CFr, the color filter CFg and the color filter CFb are formed in this order. In addition, the side portion of the color filter CFr on the color filter CFg side has a surface that gradually inclines at an angle θ° (45° or less) relative to the surface of the substrate SUB2, and the side portion of the color filter CFg on the color filter CFr side has an inclining surface (angle θ°) which faces the above described inclining surface, and the color filter CFr and the color filter CFg are provided in such a manner that the above described inclining surface of the color filter CFg overlaps with the above described inclining surface of the color filter CFr. Likewise, the side portion of the color filter CFg on the color filter CFb side has a surface that gradually inclines at an angle θ° (45° or less) relative to the surface of the substrate SUB2, and the side portion of the color filter CFb on the color filter CFg side has an inclining surface (angle θ°) which faces the above described inclining surface, and the color filter CFg and the color filter CFb are provided in such a manner that the above described inclining surface of the color filter CFb overlaps with the above described inclining surface of the color filter CFg. Furthermore, the border between the color filter CFr and the color filter CFg and the border between the color filter CFg and the color filter CFb (also the border between the color filter CFb and the color filter CFr, though not shown) have a wavy border, as in the enlargement B of the solid circles in FIG. 3A.

In the case of this structure also, even if a protrusion PJ is formed at the edge of one color filter that overlaps with the other color filter CF on the other color filter CF side, as shown in the dotted circles D and D' in FIG. 11, on the border between the color filter CFr and the color filter CFg and the border between the color filter CFg and the color filter CFr (also the border between the color filter CFb and the color filter CFr, though not shown), the height of the protrusion PJ is sufficiently small, so that a color filter CF of which the surface is flat as a whole can be formed. Accordingly, such effects can be gained that it is unnecessary to form a flattening film of a resin, for example, on the substrate SUB2 side.

Third Embodiment

Figure 12:
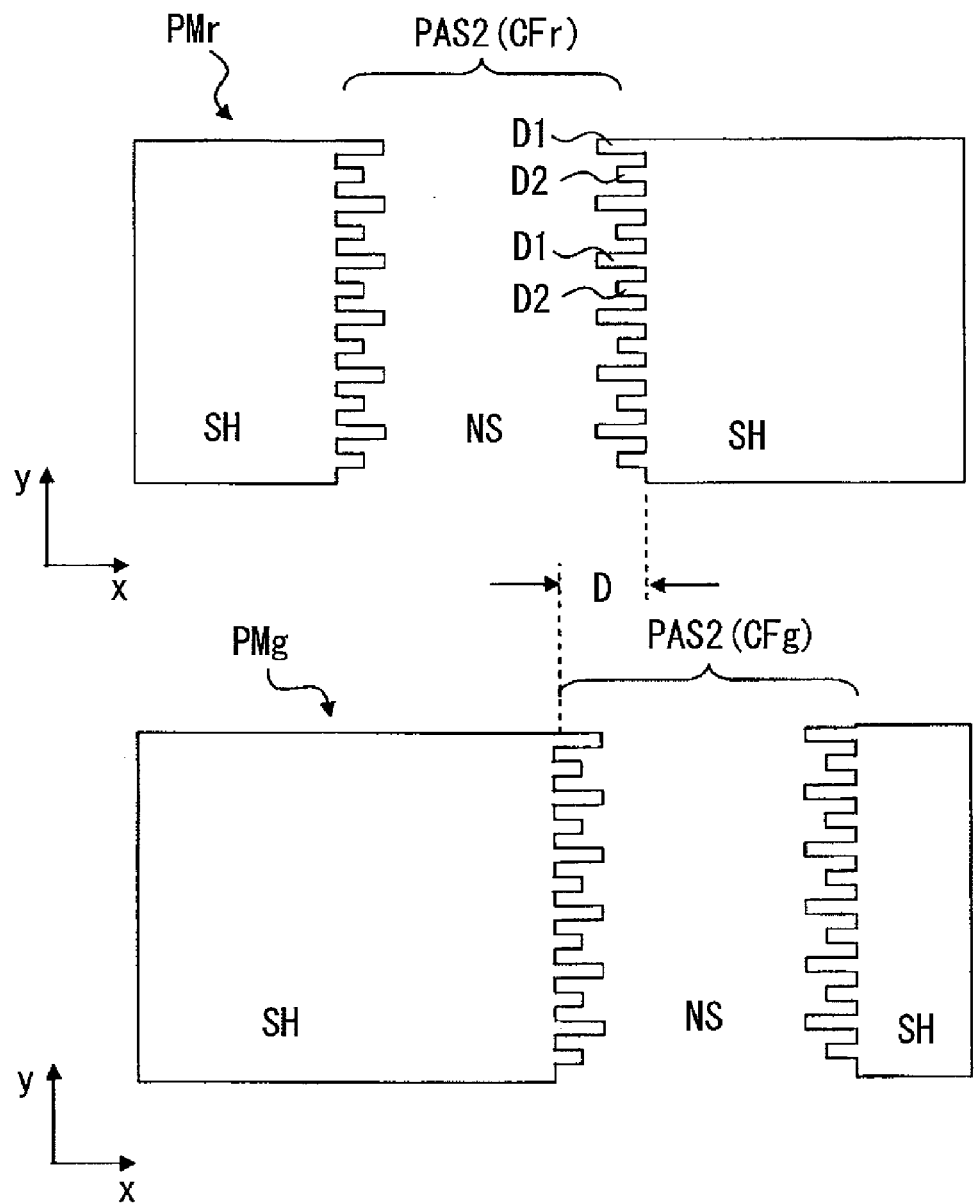
FIG. 12 is a diagram showing another example of the photomask used in the manufacturing method for a liquid crystal display device according to the present invention.

FIG. 12 is a diagram showing the manufacturing method for a liquid crystal display device according to another embodiment of the present invention and corresponds to FIGS. 5A and 5B.

The structure in FIG. 12 is different from the structure in FIGS. 5A and 5B in the following point. That is to say, two types of protrusions having different heights, which protrude from the light shielding regions SH towards the non-light shielding region NS, are formed along the border between the light shielding regions SH and the light transmitting region NS in the photomask PMr. One type of protrusions D1 has a height of approximately 3.0 µm, and the other type of protrusions D2 has a height of approximately 4.5 µm, for example, and the width of these protrusions is approximately 1.5 µm, and they are aligned alternately with intervals of approximately 1.5 µm, for example. As a result, the border between the light shielding regions SH and the light transmitting region NS has a pattern where three steps are repeated along the border due to the above described protrusions D1 and D2.

In the thus-formed photomasks PMr and PMg, the amount of transmitting light gradually becomes smaller towards the light shielding regions SH from the light transmitting region NS, and thus, the same effects as for the photomasks PMr and PMg in FIGS. 5A and 5B can be gained.

Fourth Embodiment

Figure 13:
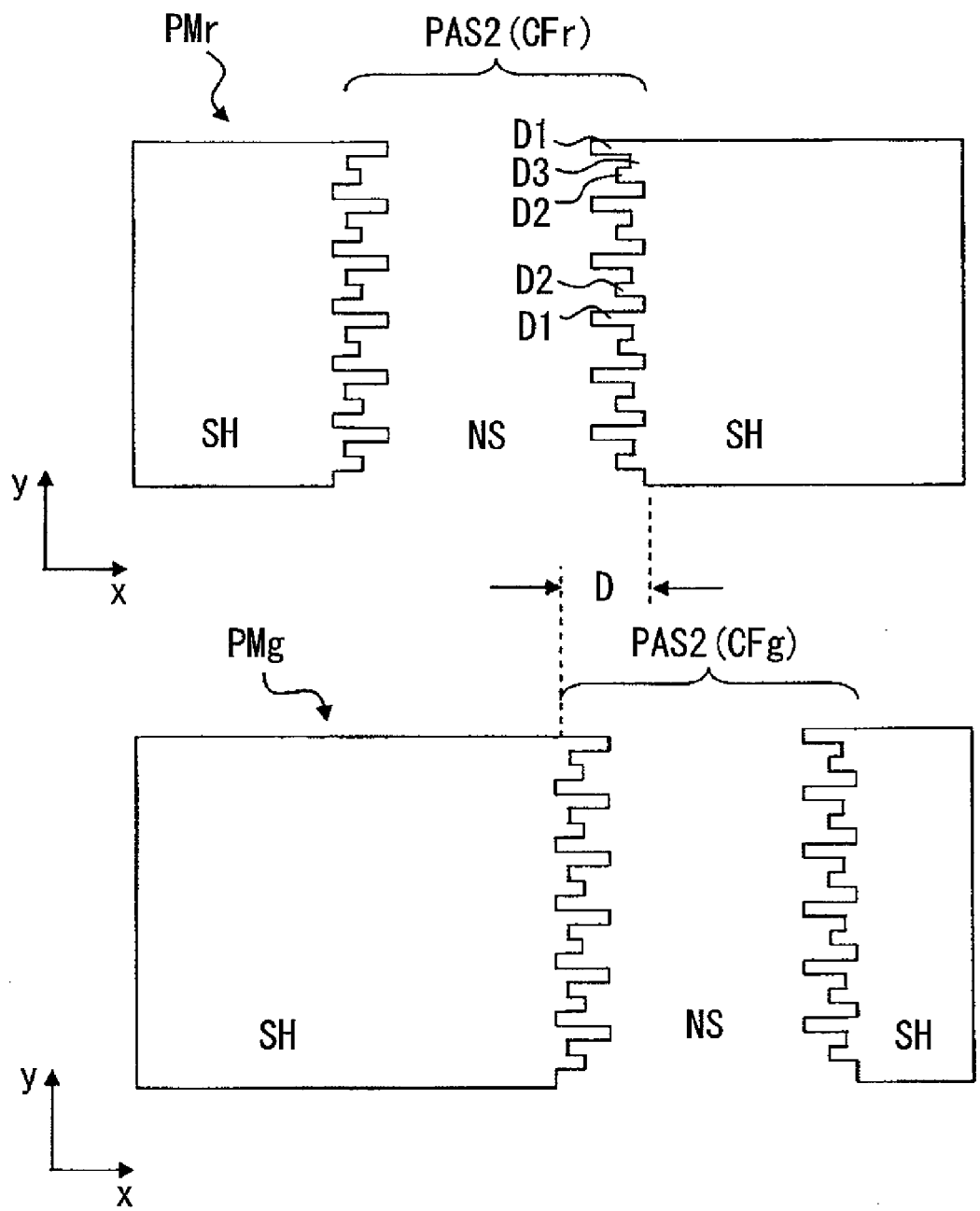
FIG. 13 is a diagram showing another example of the photomask used in the manufacturing method for a liquid crystal display device according to the present invention.

FIG. 13 is a diagram showing the manufacturing method for a liquid crystal display device according to another embodiment of the present invention and corresponds to FIG. 12.

The structure in FIG. 13 is different from the structure in FIG. 12 in that the slits between adjacent protrusions D1 and D2 having different heights are alternately filled in with a protrusion D3 having a height of approximately 1.5 µm, for example, so that the border between the light shielding regions SH and the light transmitting region NS has a pattern where four steps are repeated along the border.

In the case of this structure, the amount of transmitting light becomes gradually smaller towards the light shielding regions SH from the light transmitting region NS in the same manner as in the photomask PMr in FIG. 12.

Though the embodiments of the present invention are described in the above, the structures in these embodiments are merely examples and the present invention can be modified in various manners as long as the technological idea is not deviated from the scope of the invention. In addition, the structures in the respective embodiments may be combined for use as long as they are compatible.

What is claimed is:

1. A manufacturing method for a liquid crystal display device, wherein
   the liquid crystal display device comprises a first color filter and a second color filter that are provided on a liquid crystal side of one of a pair of substrates which are positioned so as to face each other and sandwich liquid crystal in between so as to be adjacent to each other, and
   a first side portion of said first color filter on a second color filter side overlaps with a second side portion of said second color filter on a first color filter side, characterized in that
   a first border between a light blocking region and a non-light blocking region in a photomask for forming said first color filter, which corresponds to said first side portion, has a zigzag pattern with repeating mountains and valleys along the first border, and
   a second border between a light blocking region and a non-light blocking region in a photomask for forming said second color filter, which corresponds to said second side portion, has a zigzag pattern with repeating mountains and valleys along the second border.

2. The manufacturing method for a liquid crystal display device according to claim 1, characterized in that said first color filter and said second color filter are formed of a negative photosensitive resin.

3. The manufacturing method for a liquid crystal display device according to claim 1, characterized in that thin film transistors are formed on the one of the pair of substrate.

4. A manufacturing method for a liquid crystal display device, wherein
   the liquid crystal display device comprises a first color filter and a second color filter that are provided on a liquid crystal side of one of a pair of substrates which are positioned so as to face each other and sandwich liquid crystal in between so as to be adjacent to each other, and
   a first side portion of said first color filter on a second color filter side overlaps with a second side portion of said second color filter on a first color filter side, characterized in that
   in a first border between a light blocking region and a non-light blocking region in a photomask for forming said first color filter, which corresponds to said first side portion, a number of protrusions of different heights which protrude from said light blocking region toward said non-light blocking region are created in such a manner as to form three or more steps which repeat along the first border, and
   in a second border between a light blocking region and a non-light blocking region in a photomask for forming said second color filter, which corresponds to said second side portion, a number of protrusions of different heights which protrude from said light blocking region toward said non-light blocking region are created in such a manner as to form three or more steps which repeat along the second border.

5. The manufacturing method for a liquid crystal display device according to claim 4, characterized in that said first color filter and said second color filter are formed of a negative photosensitive resin.

6. The manufacturing method for a liquid crystal display device according to claim 4, characterized in that thin film transistors are formed on the one of the pair of substrate.

7. A liquid crystal display device, comprising:
   a first substrate and a second substrate which are positioned so as to face each other and sandwich liquid crystal in between; and
   a first color filter and a second color filter which are provided so as to be adjacent to each other on a liquid crystal side of said first substrate, wherein
   a side portion of said first color filter on a second color filter side has a first inclined surface that is inclined at 45° or less relative to the main surface of said first substrate and a second inclined surface is provided so as to face said first inclined surface in a side portion of said second color filter on a first color filter side, and said first color filter and said second color filter are provided in such a manner that the second inclined surface of said second color filter overlaps with said first inclined surface of said first color filter, characterized in that
   a border between said first color filter and said second color filter has a wave pattern along said border as viewed in a plane.

8. The liquid crystal display device according to claim 7, characterized in that said first substrate has thin film transistors and said thin film transistors are covered with said first color filter or said second color filter.

9. The liquid crystal display device according to claim 8, characterized in that said first color filter and said second color filter are formed so as to also work as a protective film which prevents said thin film transistors from making contact with said liquid crystal.

10. The liquid crystal display device according to claim 7, characterized in that said second substrate has thin film transistors.

11. The liquid crystal display device according to claim 7, characterized in that said color filter is formed of a negative photosensitive resin film.

* * * * *